United States Patent
Powers et al.

(10) Patent No.: US 8,828,176 B2
(45) Date of Patent: Sep. 9, 2014

(54) POLYMER STABILIZED THERMOTROPIC LIQUID CRYSTAL DEVICE

(75) Inventors: Richard M. Powers, Lakewood, CO (US); Wil McCarthy, Lakewood, CO (US); Neil B. Cramer, Boulder, CO (US); Christopher M. Caldwell, Denver, CO (US); Michael Pickford, Denver, CO (US); Matthew B. Kish, Denver, CO (US); Andrew L. LaFrate, Boulder, CO (US)

(73) Assignee: Ravenbrick LLC, Denver, CO (US)

( * ) Notice: Subject to any disclaimer, the term of this patent is extended or adjusted under 35 U.S.C. 154(b) by 167 days.

(21) Appl. No.: 13/074,876

(22) Filed: Mar. 29, 2011

(65) Prior Publication Data

US 2011/0234944 A1    Sep. 29, 2011

Related U.S. Application Data

(60) Provisional application No. 61/318,769, filed on Mar. 29, 2010, provisional application No. 61/373,502, filed on Aug. 13, 2010.

(51) Int. Cl.

| | | |
|---|---|---|
| *B29C 65/00* | (2006.01) | |
| *B32B 37/00* | (2006.01) | |
| *A61F 13/15* | (2006.01) | |
| *G02F 1/1333* | (2006.01) | |
| *B05D 5/06* | (2006.01) | |
| *C08F 2/46* | (2006.01) | |
| *G02F 1/13* | (2006.01) | |
| *C09K 19/54* | (2006.01) | |
| *G02F 1/137* | (2006.01) | |

(52) U.S. Cl.
CPC .......... *G02F 1/132* (2013.01); *G02F 1/133305* (2013.01); *B32B 2457/202* (2013.01); *C09K 2019/548* (2013.01); *C09K 19/544* (2013.01); *B32B 2310/0831* (2013.01); *G02F 2001/13775* (2013.01)
USPC ............... 156/276; 156/60; 349/86; 427/164; 427/521

(58) Field of Classification Search
USPC ................ 156/60, 276; 349/86; 427/164, 521
See application file for complete search history.

(56) References Cited

U.S. PATENT DOCUMENTS

| | | |
|---|---|---|
| 3,990,784 A | 11/1976 | Gelber |
| 4,006,730 A | 2/1977 | Clapham et al. |

(Continued)

FOREIGN PATENT DOCUMENTS

| | | |
|---|---|---|
| CA | 2620005 | 7/2008 |
| CN | 1189224 A | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — Michael Orlando
(74) *Attorney, Agent, or Firm* — Dorsey & Whitney LLP (57) ABSTRACT

A resizable polymer-stabilized, thermotropic liquid crystal device formulation is used in passive or active light-regulating and temperature-regulating films, materials and devices, including construction materials. Implementations of the device may be composed of five basic elements: one or more transparent substrates, a transparent surface treatment, a liquid crystal mixture, a stabilizing polymer, and spacer beads. The polymer-stabilized liquid crystal is coated and cured on at least one substrate. The transparent surface treatment and the stabilizing polymer network are selected to provide phase separation, curing, and adhesion within the LC mixture. The substrate or substrates may be polarizing or nonpolarizing.

18 Claims, 2 Drawing Sheets

(56) References Cited

U.S. PATENT DOCUMENTS

| | | | |
|---|---|---|---|
| 4,155,895 A | 5/1979 | Rohowetz et al. |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A | 7/1988 | Lent et al. |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola |
| 4,871,220 A | 10/1989 | Kohin |
| 4,877,675 A | 10/1989 | Falicoff et al. |
| 4,893,902 A | 1/1990 | Baughman et al. |
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,055,089 A | 4/2000 | Schulz et al. |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi et al. |
| 6,240,114 B1 | 5/2001 | Anselm |
| 6,260,414 B1 | 7/2001 | Brown et al. |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,446,402 B1 | 9/2002 | Byker |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz |
| 6,611,640 B2 | 8/2003 | LoCasclo |
| 6,635,898 B2 | 10/2003 | Williams et al. |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. et al. |
| 6,770,916 B2 | 8/2004 | Ohshima |
| 6,777,718 B2 | 8/2004 | Takagi |
| 6,816,525 B2 | 11/2004 | Stinz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya et al. |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma et al. |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson et al. |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick et al. |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little et al. |
| 7,601,946 B2 | 10/2009 | Powers |
| 7,619,816 B2 | 11/2009 | Deng |
| 7,655,942 B2 | 2/2010 | McCarthy |
| 7,692,180 B2 | 4/2010 | Snyder |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers |
| 7,977,621 B2 | 7/2011 | McCarthy |
| 8,072,672 B2 | 12/2011 | Powers et al. |
| 8,076,661 B2 | 12/2011 | McCarthy et al. |
| 8,169,685 B2 | 5/2012 | Powers |
| 8,271,241 B2 | 9/2012 | Akyurtlu |
| 8,284,336 B2 | 10/2012 | Powers |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1* | 12/2002 | Schadt et al. ............ 349/117 |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn et al. |
| 2003/0107927 A1 | 6/2003 | Yerushalmi |
| 2003/0129247 A1 | 7/2003 | Ju et al. |

(56) References Cited

U.S. PATENT DOCUMENTS

| | | |
|---|---|---|
| 2003/0138209 A1 | 7/2003 | Chan |
| 2003/0214632 A1 | 11/2003 | Aastuen |
| 2003/0218712 A1* | 11/2003 | Kumar et al. .................. 349/155 |
| 2003/0227663 A1 | 12/2003 | Agrawal |
| 2004/0005451 A1 | 1/2004 | Kretman et al. |
| 2004/0012749 A1 | 1/2004 | Freeman |
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |
| 2005/0271092 A1 | 12/2005 | Ledentsov |
| 2006/0011904 A1 | 1/2006 | Snyder et al. |
| 2006/0147810 A1 | 7/2006 | Koch |
| 2006/0151775 A1 | 7/2006 | Hollenberg |
| 2006/0238867 A1 | 10/2006 | Takeda |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Gandhi |
| 2008/0008857 A1 | 1/2008 | Kalkanoglu et al. |
| 2008/0013174 A1 | 1/2008 | Allen |
| 2008/0061222 A1 | 3/2008 | Powers et al. |
| 2008/0117500 A1 | 5/2008 | Narendran et al. |
| 2008/0138543 A1 | 6/2008 | Hoshino |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi et al. |
| 2009/0167971 A1 | 7/2009 | Powers et al. |
| 2009/0219603 A1 | 9/2009 | Xue |
| 2009/0266394 A1 | 10/2009 | Tsubone |
| 2009/0268273 A1 | 10/2009 | Powers et al. |
| 2009/0296190 A1 | 12/2009 | Anderson et al. |
| 2010/0001008 A1 | 1/2010 | McCarthy et al. |
| 2010/0015363 A1 | 1/2010 | Chiang et al. |
| 2010/0027099 A1 | 2/2010 | McCarthy et al. |
| 2010/0045924 A1 | 2/2010 | Powers et al. |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1 | 2/2011 | Santoro et al. |
| 2011/0102878 A1 | 5/2011 | McCarthy et al. |
| 2011/0205650 A1 | 8/2011 | Powers et al. |
| 2011/0216254 A1 | 9/2011 | McCarthy et al. |
| 2011/0234944 A1 | 9/2011 | Powers et al. |
| 2011/0292488 A1 | 12/2011 | McCarthy |
| 2012/0140311 A1 | 6/2012 | Powers et al. |
| 2012/0262773 A1 | 10/2012 | Powers et al. |
| 2013/0033738 A1 | 2/2013 | Powers et al. |

FOREIGN PATENT DOCUMENTS

| | | |
|---|---|---|
| CN | 1350648 | 5/2002 |
| CN | 1494091 | 5/2004 |
| EP | 1162496 | 12/2001 |
| GB | 2261989 | 6/1993 |
| JP | 49-094145 | 6/1974 |
| JP | 58010717 | 1/1983 |
| JP | 58010717 A | 1/1983 |
| JP | 59-231516 | 12/1984 |
| JP | 61223719 | 10/1986 |
| JP | 61223719 A | 10/1986 |
| JP | 1178517 A | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-012818 | 1/2004 |
| JP | 2004-291345 | 10/2004 |
| JP | 2005-250119 | 9/2005 |
| JP | 2006-243485 | 9/2006 |
| JP | 2006-285242 | 10/2006 |
| JP | 2007-515661 | 6/2007 |
| JP | 2007-272016 | 10/2007 |
| JP | 2008-530766 | 8/2008 |
| KR | 2002-0044153 | 6/2002 |
| KR | 2004-48916 | 4/2003 |
| KR | 2003-0072578 | 9/2003 |
| KR | 10-2004-0048916 | 6/2004 |
| KR | 10-2004-0108816 | 12/2004 |
| KR | 10-2006-0000059 | 1/2006 |
| KR | 10-2007-0091314 | 9/2007 |
| KR | 10-2010-0039401 | 4/2010 |
| WO | 94/02313 | 2/1994 |
| WO | 97/01789 A2 | 1/1997 |
| WO | 01/23173 | 4/2001 |
| WO | 02/064937 | 8/2002 |
| WO | 03/029885 A1 | 4/2003 |
| WO | 03/096105 | 11/2003 |
| WO | 2005/031437 | 4/2005 |
| WO | 2006/023195 A2 | 3/2006 |
| WO | WO 2006/023195 | 3/2006 |
| WO | 2006/088369 | 8/2006 |
| WO | 2008/092038 A1 | 7/2008 |
| WO | WO 2008/092038 | 7/2008 |
| WO | 2008/106596 A1 | 9/2008 |
| WO | 2008/144217 | 11/2008 |

OTHER PUBLICATIONS

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Rogacheva, A.V., et al., "Giant gyrotropy due to electromagnetic-field coupling in a bilayered chiral structure," Physical Review Letters 97, 177401 (Oct. 27, 2006).

Sung, J. et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

(56) References Cited

OTHER PUBLICATIONS

West, J. L. et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Korean Intellectual Property Office as International Searching Authority, International Search Report and Written Opinion for International Application No. PCT/US2008/051959, Jun. 6, 2008, 10 pages.

Korean Intellectual Property Office as International Searching Authority, International Search Report and Written Opinion for International Application No. PCT/US2008/069881, Sep. 30, 2008, 10 pages.

Korean Intellectual Property Office as International Searching Authority, International Search Report and Written Opinion for International Application No. PCT/US2008/087964, Mar. 31, 2009, 12 pages.

Korean Intellectual Property Office as International Searching Authority, International Search Report and Written Opinion for International Application No. PCT/US2009/041576, Nov. 25, 2009, 7 pages.

Notice of Allowance, U.S. Appl. No. 12/019,602, dated Jun. 9, 2010 (now Pat. 7,768,693).

Notice of Allowance, U.S. Appl. No. 12/172,156, dated Mar. 11, 2010 (now Pat. 7,755,829).

Notice of Allowance, U.S. Appl. No. 12/843,218, dated Apr. 12, 2011.

Notice of Allowance, U.S. Appl. No. 12/830,068, dated Aug. 22, 2011.

Fan, et al., "Thin-film conducting microgrids as transparent heat mirrors", Appl. Phys. Lett., vol. 28, No. 8, Apr. 5, 1976, 440-442.

Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.

United States Patent and Trademark Office as International Searching Authority, International Search Report and Written Opinion for International Application No. PCT/US2011/030371, Jun. 1, 2011, 7 pages.

First Patent Examination Report dated Feb. 19, 2013, AU Application No. 2011235265, 3 pages.

Communication pursuant to Rules 161(2) and 162 dated Nov. 7, 2012, EP Application No. 11763329.7, 2 pages.

Response to Communication pursuant to Rules 161(2) and 162 dated May 8, 2013, EP Application No. 11763329.7, 14 pages.

Notice of Preliminary Rejection dated Dec. 30, 2013, KR Application No. 10-2012-7028069, 12 pages.

\* cited by examiner

POLYMER STABILIZED THERMOTROPIC LIQUID CRYSTAL DEVICE

CROSS REFERENCE TO RELATED APPLICATIONS

This application claims the benefit of priority pursuant to 35 U.S.C. §119(e) of U.S. provisional application No. 61/318,769 filed 29 Mar. 2010 entitled "Polymer-stabilized thermotropic liquid crystal device" and U.S. provisional application No. 61/373,502 filed 13 Aug. 2010 entitled "Polymer-stabilized thermotropic liquid crystal device," each of which is hereby incorporated herein by reference in its entirety.

This application is related to U.S. Pat. No. 7,768,693 to McCarthy et al., U.S. Pat. No. 7,755,829 to Powers et al., and U.S. patent application publication Nos. 2011/0025934, 2010/0288947, 2010/0271686, 2010/0259698, 2010/0045924, 2010/0027099, 2009/0268273, 2009/0167971, 2009/0015902, and 2008/0210893 to Powers and McCarthy et al., each of which is hereby incorporated by reference herein in its entirety.

BACKGROUND

1. Technical Field

The subject matter described herein relates to a polymer-stabilized, low clearing point, thermotropic liquid crystal device. Implementations of such devices have application in passive or active light-regulating and temperature-regulating films, materials and devices, including construction materials.

2. Description of the Related Art

The problem of controlling the flow of radiant energy, e.g., light and heat, in particular in applications such as regulating solar heat gain in buildings and in other applications has previously been addressed using many optical and infrared methodologies. Photodarkening materials have been used for decades, for example, in sunglass lenses, to selectively attenuate incoming light when stimulated by ultraviolet (UV) radiation. When incorporated into windows, such materials can be used to regulate the internal temperature of a structure by darkening to attenuate bright sunlight, and by becoming transparent again to allow artificial light or diffuse daylight to pass through unimpeded. Such systems are passive and self-regulating, requiring no external signal other than ambient UV light in order to operate. However, because they are controlled by UV light rather than by temperature, such systems are of limited utility in temperature-regulating applications. For example, they may block wanted sunlight in cold weather as well as unwanted sunlight in hot weather. They also do not function if placed behind a UV-blocking material such as the transparent, spectrally-selective and low-emissivity coatings that are common in the window industry.

U.S. Pat. No. 7,755,829 discloses an optical filter that can be used as a window film or other light- and heat-regulating building material that is composed of a thermotropic, low clearing point, twisted nematic, liquid crystal sandwiched between two reflective polarizers that can be used as a window film or other light- and heat-regulating building material. Similarly, in U.S. patent application publication no. 2009/0167971 by Powers et al., a thermodarkening filter composed of a low clearing point liquid crystal sandwiched between two absorptive polarizers is disclosed as a component of building materials, e.g., a window film. In addition, U.S. patent application publication nos. 2010/0045924 and 2010/0259698 by Powers et al. disclose thermotropic, light-regulating liquid crystal devices that do not require polarizing substrates. Further, U.S. patent application publication no. 2010/0045924 by Powers et al. describes some methods of manufacturing this filter technology in which the thermotropic liquid crystal is polymer-stabilized.

The mixing of liquid crystal (LC) components to obtain desired properties, such as particular values of birefringence, clearing point, crystallization point and melting point, (e.g., for use in video displays), has been practiced for decades and has been well described in the prior art. The mixing and curing of stabilizing polymers or polymer networks within a liquid crystal (e.g., for use in flexible liquid crystal devices) has also been well described. However, there are no prior formulations for thermotropic, low clearing point, polymer-stabilized liquid crystals suitable for use in twisted-nematic, thermally switched, light-regulating and heat-regulating devices.

The doping or stabilization of liquid crystal mixtures with polymers—under various nomenclature including, for example, polymer-dispersed liquid crystal (PDLC), polymer-enhanced liquid crystal (PELC), polymer-stabilized twisted nematic (PSTN), polymer network twisted nematic (PNTN), pixel isolated liquid crystal (PILC), liquid crystal dispersions, and others—is also well described. For example, U.S. Pat. No. 7,355,668 to Satyendra et al. discloses polymer-enhanced liquid crystal devices built with rigid or flexible substrates that include polymer "columns" formed between substrate films through the phase separation of a prepolymer (e.g., Norland NOA77 or NOA78 optical adhesive) and a liquid crystal (e.g., Merck E7, E48, or E31), under the influence of temperature variations. The pre-polymer and liquid crystal are mixed above the clearing point temperature of the LC, and are then cooled below the clearing point such that they phase separate and polymerize.

Another example is U.S. Pat. No. 6,049,366 to Hassan-ali et al., which discloses polymer-stabilized liquid crystals and flexible devices thereof. In this design, the phase separation and curing of the prepolymer from the liquid crystal occurs under the influence of a UV curing lamp or heat source. The liquid crystal can be any of a vast assortment of materials disclosed in the application, and the prepolymer can be any of a vast assortment as well including, but not limited to, CN934, CN94760, CN970A60, CN945B85, and UVS-500 available from Croda Resins; EBECRYL resin 284 and 810 available from UCB Chemicals; and the Photometric 6000 Series (6010, 6210, 6008, etc.) available from Henkel.

Polymer networks are also formed by phase separation and/or curing as a result of (or induced by) photo-initiation, visible light, infrared light, electric fields, lasers, charged particle beams, or chemical catalysis as well as the broad classes of solvent-induced phase separation (SIPS), thermally-induced phase separation (TIPS), and polymerization-induced phase separation (PIPS), etc. Furthermore, it is possible to impose a periodic or nonperiodic pattern on the polymer as it cures by masking and diffraction, or other similar methods, such that an image, grid, grating, holographic, or photonic material is formed, as described for example in "Holographic Polymer-Dispersed Liquid Crystals: Materials, Formation, and Applications," by Y. J. Liu and X. W. Sun (Hindawi Publishing Corporation, Advances in OptoElectronics, Volume 2008, Article ID 684349).

Because the polymer-stabilized liquid crystal devices described above are intended as electrically operated video displays or other electro-optical devices, the devices associated with them explicitly include transparent electrode layers (e.g., indium tin oxide), and further describe, either explicitly or implicitly, liquid crystals intended to be actuated (i.e., physically reoriented) by electric fields.

The information included in this Background section of the specification, including any references cited herein and any description or discussion thereof, is included for technical reference purposes only and is not to be regarded as subject matter by which the scope of the invention as set forth in the claims below is to be bound.

SUMMARY

A polymer-stabilized, thermotropic, thermally-switched, low clearing point, liquid crystal-based device suitable for use in light regulating building materials may be used to form thermochromic or thermotropic optical and near infrared filters (e.g., thermochromic window filters, including thermoreflective window filters), which can be fashioned in a variety of formats including rigid structures (e.g., windows) and also robust, light, flexible, structures (e.g., films). Implementations of the device disclosed herein may be composed of five basic elements: one or more substrates, one or more transparent or translucent surface treatments (which may include layers partially transparent to one or more frequencies of light), a liquid crystal mixture (which may include guest-host systems), one or more stabilizing polymers, and spacers (which may include spacer beads, rods, fibers, and other such structures, whether regular or irregular in shape). In implementations described herein, the polymer-stabilized liquid crystal is coated and cured on at least one substrate, although in some embodiments the substrate may later be removed.

In one implementation, a resizable polymer-stabilized, thermotropic liquid crystal device is formed on a transparent substrate. A mixture of liquid crystal components coats the substrate. The mixture of liquid crystal components has a clearing point within a typical range of atmospheric temperatures and a freezing point below an expected minimum atmospheric temperature. A means of defining a thickness of the coating of the mixture of liquid crystal components is also provided. A stabilizing polymer is further provided in conjunction with the mixture of liquid crystal components on the substrate. The stabilizing polymer may adhere to the substrate, the surface treatment, or both, and cures under the influence of an external stimulus. A surface treatment may further be provided on the substrate to promotes polymer adhesion of the stabilizing polymer with the substrate. The surface treatment may be wholly or partially transparent or translucent to one or more wavelength bands.

In another implementation, a method for manufacturing a resizable polymer-stabilized, thermotropic liquid crystal device includes coating a transparent substrate with a mixture of liquid crystal components having a clearing point within a typical range of atmospheric temperatures and a freezing point below an expected minimum atmospheric temperature. A thickness of the mixture of liquid crystal components is then defined and maintained. A stabilizing polymer is applied to the substrate and cured with an external stimulus to adhere the stabilizing polymer to the substrate. A surface of the substrate may be treated with a material that is wholly or partially transparent or translucent to one or more wavelength bands and that promotes polymer adhesion with the substrate. Further, the thickness of the mixture of liquid crystal components may be defined and maintained by distributing a plurality of micro-scale spacers within the mixture of liquid crystal components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

A polymer-stabilized, thermotropic, thermally-switched, low clearing point, liquid crystal-based device suitable for use in light regulating building materials may be used to form thermochromic or thermotropic optical and near infrared filters (e.g., thermochromic window filters, including thermoreflective, thermoabsorptive, thermodiffusive, and thermofluorescent window filters), which can be fashioned in a variety of formats including rigid structures (e.g., windows) and also robust, light, flexible, structures (e.g., films). Implementations of the device disclosed herein may be composed of five basic elements: one or more substrates, one or more surface treatments that are transparent or translucent to one or more wavelength ranges of light, a liquid crystal mixture, one or more stabilizing polymers, and spacers. Some embodiments include all five elements, while in other embodiments the functions of two or more elements may be combined into a single element. In implementations described herein, the polymer-stabilized liquid crystal is coated and cured on at least one substrate.

The term "polymer-stabilized" with regard to twisted nematic liquid crystals often refers specifically to stabilization of the nematic state itself. That is because the polymers are cured in an arrangement that encourages nematic (whether linear—e.g., hometropic or planar—nematic or twisted nematic) alignment of the liquid crystal molecules, the switching times and energy requirements of the liquid crystal device (e.g., an electro-optical video display) may be reduced. Liquid crystal devices or formulations described as "polymer-stabilized" often have polymer percentages below ~5%. Conversely, liquid crystal devices or formulations described as "polymer-dispersed" often have much higher polymer percentages (e.g., 10% or higher). However, the two terms are often used interchangeably, both with each other and with the other terms cited above, such as polymer network, etc.

For the purposes of this document, the word "stabilized" shall be defined in a superset of the above meanings, including physical stabilization, LC orientation stabilization, mechanical containment or encapsulation, spacing, etc., of the liquid crystal material and of any devices that incorporate the material. Thus, in the context of this document, the term "polymer-stabilized liquid crystal" encompasses polymer-dispersed liquid crystal (PDLC), polymer-enhanced liquid crystal (PELC), polymer-stabilized twisted nematic (PSTN), polymer network twisted nematic (PNTN), pixel isolated liquid crystal (PILC), and any other LC composite formulation wherein polymers are mixed, interspersed, or alternated with liquid crystal for the purposes described herein. In addition, this definition should be interpreted independently of the liquid crystal alignment and morphology, so that it describes formulations suitable not only for twisted nematic states and devices, but also supertwist, vertical alignment, smectic, guest-host, blue phase, pi cell, chiral, discotic, and a vast assortment of other liquid crystal states and devices. Furthermore, this definition does not refer to, nor is it affected by, any particular mechanism for inducing phase separation of the polymer from the liquid crystal, or curing or polymerization of the polymer (e.g., by heat, photoinitiation, UV, visible light, controlled temperature changes, changes in solvent concentration, chemical catalysis, etc.) Finally, the term should be interpreted independently of the precise mechanism of polymerization, such that polymers formed by the joining of monomers via "addition polymerization," "condensation polymerization," "step-growth polymerization," "chain-growth polymerization," or other mechanisms shall be described equally well as "stabilizing polymers."

In the exemplary embodiments described herein, the substrate may be at least partially transparent or translucent to some wavelengths of light so as to permit the transmission of light at a particular range of wavelengths (e.g., solar radiation, which includes visible light and near infrared radiation). In one exemplary embodiment, the substrate or substrates may consist of or may incorporate polarizing structures or materials to enable an optical "shutter," wherein the liquid crystal is a thermotropic, twisted nematic liquid crystal as described for example in U.S. Pat. No. 7,755,829 to Powers et al. In another exemplary embodiment, the substrate or substrates may be nonpolarizing, to enable an optical "shutter" wherein the liquid crystal is a thermotropic guest-host liquid crystal, as described for example in U.S. patent application publication number 2010/0259698 by Powers et al. In cases where a transparent or translucent surface treatment is applied to the substrate or substrates, the actual composition of the substrate may not be of great importance, except insofar as the material must allow for adequate adhesion of the surface treatment. In other cases, the surface treatment may be combined with the substrate as a single element, and in these cases, the composition may matter greatly.

The transparent surface treatment is applied to a substrate material or possibly combined with a substrate material (i.e., a substrate selected such that it does not need a surface treatment, or serves as its own surface treatment). The surface treatment promotes adhesion of, and prevents chemical reaction with, the polymer-stabilized liquid crystal materials. Depending on the type of LC, the type of thermotropic phase transition, and the type of polymer stabilization employed in the device, the surface treatment may also serve as a liquid crystal alignment layer. In such a case, the surface treatment may be rubbed, stretched, embossed, or otherwise textured in order to promote the alignment of the liquid crystal molecules. Or the surface treatment may induce alignment in other ways, e.g., through innate chemical or physical properties. Additionally, the surface treatment may serve as a dichroic coating with an index of refraction different than that of the substrate and/or the liquid crystal. The surface treatment may also serve as an anchor for other molecules such as dye molecules. In exemplary embodiments, the surface treatment may be a curable polymer. Appropriate chemical classes may include, but are not limited to, ethyl cyanoacrylates, methyl cyanoacrylates, thiol-ene adhesives, acrylates, diacrylates, triacrylates, methacrylates, urethane acrylates, and acrylated epoxies.

Specific examples of surface treatments that may be appropriate for this application may include, but are not limited to, one or more of the following: 2-(2ethoxyethoxy) ethyl acrylate 13; tetrahydrofurfuryl acrylate 18; 1,6hexanediol diacrylate 22; tripropyleneglycol diacrylate 17; polyethyleneglycol diacrylate 10; propoxylated neopentylglycol diacrylate 16; trimethylolpropane triacrylate 28; ethoxylated trimethylolpropane triacrylate 19; Satromer SR295, SR339, SR340, or SR368; Sartomer CN9008; Sartomer CN991; Sartomer PRO12127 and PRO12228; any of the Devcon PB family of adhesives; Bekaert Specialty Films Hardcoat-D and Hardcoat-RB; Croda Resins CN934, CN94760, CN970A60, CN945B85, and UVS-500; UCB Chemicals EBECRYL resin 284 and 810; and any of the Henkel Photometric 6000 Series (6010, 6210, 6008, etc.).

Transparent or translucent inorganic coatings such as $SiO_2$, $TiO_2$, SnO, sapphire, diamond-like carbon, and a variety of other materials are increasingly available on a variety of substrates, including polymer films. Some embodiments of the LC device may use inorganic surface treatments in place of or in addition to organic ones. It may also be desirable for the surface treatment to be a thermoplastic material (e.g., as an aid to heat sealing or as a means of heat-melting the spacer beads into place). Exemplary materials that are well suited to this use include amorphous polyesters such as amorphous polyethylene terephthalate (APET), polyethylene terephthalate glycol (PETG), and ethylene glycol-terephthalic acid-1, 4-cyclohexanedimethanol copolymer (PCTG), although many others exist, including high-melting-point thermoplastics such as fluorinated ethylene propylene (FEP), ethylene tetrafluoroethylene (ETFE), and polytetrafluoroethylene (PTFE).

It should be noted that high-birefringence materials such as polyethylene terephthalate (PET), crystalline polyethylene terephthalate (CPET), and biaxially-oriented polypropylene (BOPP) are not generally suitable because of their interference with the optical properties of polarizers and LCs, although there are some uses (e.g., as retarders or waveplates) where birefringence is actually advantageous, if the optical axes of the different layers are correctly aligned. Methods for aligning retarders and other birefringent materials in an optical stack are well described in the prior art, and need no further elaboration here.

The liquid crystal may generally consist of a mixture of liquid crystal components selected for the following properties: a low-clearing point within a typical range of atmospheric temperatures (e.g., a clearing point close to human environmental temperatures ("room temperature"), e.g., between 10° C. and 40° C., although higher and lower clearing points may also be used); a freezing point below an expected minimum operating temperature, e.g., below those typically encountered in a particular human environment (i.e., below −40° C.); UV stability such that long lifetime may be expected in outdoor environments; and good miscibility such that the liquid crystal components are unlikely to separate over time. A low freezing point may provide a broad nematic range for the LC and prevent crystallization of the LC, which may render it opaque at typical outdoor temperatures and therefore not aesthetic (or even functional) for transparent applications such as window films. It is also desirable, though not necessary, for the liquid crystal to have a low toxicity, e.g., an adult human oral dose LD50 of 100 ml or higher. Mixtures of cyanobiphenyls including 3CB, 4CB, 5CB, 6CB, 7CB, 8CB, 8OCB are known to work well in this regard, and an additive such as B2 can be introduced in small amounts to adjust the clearing point upwards as desired.

For example, a mixture of 67% 5CB and 33% 7CB has a clearing point of approximately 37° C., while a mixture of 40% 3CB, 40% 5CB, and 20% 7CB has a clearing point of approximately 33° C. A more complex mixture, combining 40% 3CB, 4% 4CB, 40% 5CB, 15% 7CB, and 1% B2, has a clearing point of approximately 34° C. All of these mixtures have good UV stability, and a freezing point well below −40° C. However, mixtures which include even-numbered cyanobiphenyls (4CB, 6CB, 8CB) may be observed to be less chemically stable over time when exposed to temperatures in excess of 50° C. For building material applications, where daytime temperatures of 80° C. and even 90° C. are possible, these components may be less desirable. Conversely, mixtures of odd-numbered cyanobiphenyls (3CB, 5CB, 7CB) may be more stable over time at these elevated temperatures, and may thus be particularly well suited for building material applications such as smart windows. In addition, the formulas can be modified to provide a clearing point higher or lower than the typical range of atmospheric temperatures, such that thermotropic properties of the mixture of liquid crystal components are effected at operating temperatures expected in exotic environments, including, but not limited to, for example, motor vehicles, aircraft, and spacecraft.

Other useful additives may include esters and cyanoterphenyls, and the liquid crystal may also contain a small amount (typically about one-tenth of one percent, although other amounts have been used successfully) of chiral dopant such as Merck ZLI-811 or Huarui Scientific S811 to reduce the appearance of disclination lines during the transition from nematic to isotropic and back again, or during other thermotropic phase transitions. Unlike many LC components, 5CB and 6CB are liquid at room temperature, and may serve as effective solvents for numerous other liquid crystal components that would normally be solid at room temperature. Thus, it may be more convenient to mix LC components that are in powder form at room temperature into other LC components that are in liquid form, rather than melting the powders and then mixing them together, or mixing the powders together and then heating them until they have all melted. The LC may be a eutectic mixture and/or have a wide nematic range in addition to a low clearing point.

The art of mixing liquid crystal components is generally known and the above formulations are merely exemplary implementations of the present technology. Properties such as clearing point tend to be close to the average of the clearing points of the individual components, weighted by their percentages in the mixture. Other properties, such as freezing point, are improved by the mixture of dissimilar components, so that while two components may individually have freezing points of 35° C. (for example), when mixed together they will typically have a much lower freezing point (e.g., below −40° C.), as lower temperatures (i.e., smaller molecular motions) are required to produce fully crystalline order in the dissimilar molecules. Still other properties, such as UV resistance, may be driven by the weakest component of the mixture, since unwanted chemistry may begin to appear as soon as any component of the mixture begins to break down. Mixtures can be chosen that are miscible with each other in the expected environment. These are familiar principles in the LC art, and a variety of liquid crystal mixtures appropriate to the technology disclosed herein may be produced.

A partial list of liquid crystal components that may be used in implementations of the devices described herein may include the following: aromatic and aliphatic organic compounds such as benzylideneanilines, generally prepared from the reaction of para-substituted benzaldehyde and parasubstituted aniline; N-(p-alkoxybenzylidene)-p-amiostyrenes, prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted diphenylacetylenes; p,p'-disubstituted-1,4-diphenylbutadienes; p,p'-disubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds for use in implementations described herein may include one or more of the following: ethyl p-4-ethoxybenzylideneaminocinnamate; p,p'-azoxybenzoic acid diethyl ester; N-(p-methoxybenzylidene)-p-aminostyrene; N-(p-butoxybenzylidene)-p-aminostyrene; p-azoxyanisole; p-hexyloxybenzalazine; p-azoxy-phenetole; p-anisylidene-p-biphenylamine; p-ethoxybenzylindene-p-biphenylamine; p-anisylidene-p-aminophenyl acetate; p-ethoxybenzylidene-p-aminophenyl acetate; p-n-hexyloxy-benzylidene-p-aminophenyl acetate; p-n-hexyloxybenzylidene-p-aminophenyl acetate; deca-2,4-dienoic acid; 4,4' di-n-heptoxyazoxybenzene; 4,4' di-n-pentoxyazoxybenzene; 4,4' di-n-butoxyazoxybenzene; 4,4'diethoxy-azoxybenzene; undeca-2,4-dienoic acid; nona-2,4-dienoic acid; 4,4'-dimethoxystilbene; 2,5-di(p-ethoxybenzylidene)cyclopentanone; 2,7-di-(benzylideneamino)fluorene; 2-p-methoxy-benzylideneamino-phenanthrene; 4-methoxy-4"-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinnamic acid; 6-methoxy-2-naphtholic acid; p-phenylene di-p-anisate; p-phenylene di-p-ethoxybenzoate; p-phenylene di-p-n-hexy-loxybenzoate; p-phenylene di-p-n-heptyloxybenzoate; p-phenylene di-p-n-octyloxybenzoate; 1,4-bicyclo[2.2.2]octylene di-p-anisate; 1,4-bicyclo[2.2.2]octylene di-p-n-octyloxybenzoate; trans-1,4-cyclohexylene di-p-n-butoxybenzoate; 4,4'-di(p-methoxybenzylideneamino)dibenzyl; p,p'-diacetoxystilbene; 1,2-di(p-methoxyphenyl)-acetylene; p-(p-acetoxyazo)benzoic acid; 1,4-di-(p-methoxyphenyl)-butadiene; p-anisal-p-anisidine; p,p'-dimethoxydibenzal-1,4-naphthalenediamine; p-n-butylbenzoic acid; p,p'-di-n-butyldiph-enylpyridazine; p-(p-cyanobenzal) anisidine; p-(p-methoxybenzoxy benzoic acid, anisal-p-aminozobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene) benzidine; p-bis (heptyloxybenzoyloxy)benzene; p-n-propoxybenzoic acid; p-n-butoxybenzoic acid; p-n-amyloxybenzoic acid; p-n-hexyloxybenzoic acid; p-n-heptyloxybenzoic acid; p-n-octyloxybenzoic acid; butyl-p-(p-ethoxyphenoxycarbonyl)phenylcarbonate; p-(p-ethoxy-phenylazo)-phenylheptanoate; 4-[(p-hexyloxycarbonyloxybenzylidene)amino]-1-pentyloxybenze ne; N-p-(pentyloxycarbonyloxy)benzylidene]-p-anisidine; p-[(p-butoxyphenyl)azo]phenyl butyl carbonate; p-(p-ethoxyphenylazo)phenyl hex-anoate; p-(p-ethoxy-phenylazo)phenyl valerate; p-[(p-ethoxybenzylidene)amino] benzonitrile; p-[(p-methoxybenzylidene)amono]benzonitrile; ethyl p-[(p-methoxybenzylidene)amino]cinnamate; p-(p-ethoxypheny-lazo)-phenyl crotonate; p-[(p-methoxybenzylidene)amino]-phenyl p-toluate; p-[(p-methoxybenzylidene)amino]-phenylbenzoate; p-[(p-ethoxybenzylidene)amino]phenylbenzoate; N,N'-di(p-methoxybenzylidene)-a,a'-bitoluidine; p-anisalazine; 4-acetoxy-3-methoxycinnamic acid; p-acetoxycinnamic acid; 4'-[(p-pentyloxycarbonyloxy-benzylidene)aminovalerophenol diethyl p,p'-azoxydicinnammate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzlidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-hexyloxybenzylidene-4'-aminopropiophenone; 4-methoxybenzylidene-4'-aminopropiophenone; 4-nonyloxybenzylidene-4'-aminopropiophenone; 4-octyloxybenzylidene-4'-aminopropiophenone; 4-pentyloxybenzylidene-4'-aminopropiophenone; 4-propoxybenzylidene-4' aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxyben-zylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine, bis-(4-n-decyloxybenzylidene)-1,4-phenylenediamine; bis(4-n-dodecyloxybenzlidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxy-benzylidene)-1,4-phenylenediamine; bis-(4-n-pentyloxybenzylidene)-1,4-phenylenediamine; terephthal-bis-(p-bromoaniline); terephthal-bis-(p-chloroaniline); terephthal-bis-(p-fluoroaniline); terephthal-bis-(p-iodo-aniline), and the like.

Nematic liquid crystalline materials for use in implementations described herein may include the following: p-azoxyanisole, p-azoxyphenetole, p-butoxybenzoic acid, p-methoxy-cinnamic acid, butyl-p-anisylidene-p-aminocinnamate, anisylidene p-amino-phenylacetate, p-ethoxy-benzal-amino-α-methyl-cinnamic acid, 1,4-bis(p-ethoxybenzylidene)cyclohexanone, 4,4'-dihexyloxybenzene, 4,4'-diheptyloxybenzene), anisal-p-amino-azo-benzene, anisaldazine, a-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylidene-p'-aminophenylpeatoate and mixtures thereof.

Conjugated cyano-organic compounds that are useful may include the following: 7,7',8,8'-tetracyanoquinodimethane (TCNQ), (2,4,7,-trinitro-9-fluorenylidene)-malono-nitrile (TFM), p-[N-(p'-methoxybenzylidene)amino]-n-butyl-benzene (MBBA), p-[N-(p'-ethoxybenzylidene)amino]-butyl-benzene (EBBA), p-[N-(p'-methoxybenzylidene)amino]phenyl butyrate, n-butyl-p-(p'-ethoxyphenoxycarbonyl) phenylcarbonate, p-methoxy-p'-n-butylazoxybenzene, p-ethoxy-p'-n'-butylazobenzene, p-[N-(p'-methoxybenzylidene)amino]benzonitrile (BBCA), p-[N-(p'-methoxybenzylidene)amino]benzonitrile (BBCA), p-[N-(p'-hexyl-benzylidene)amino]benzonitrile (HBCA), pentylphenylmethoxy benzoate, pentylphenylpentyloxy benzoate, cyanophenylpentyl benzoate, cyanophenylheptyloxy benzoate, cyanophenyloctyloxy benzoate, and cyanophenylmethoxy benzoate.

In principle, any of these liquid crystal materials could serve as components of implementations of the LC device, provided the materials are mixed in the right proportions to produce the desired clearing point, freezing point, UV stability, and miscibility. For example, the book "Liquid Crystal Dispersions" (Paul S. Drzaic, World Scientific Publishing Co., Ltd., 1995, ISBN 981-02-1745-5), which is hereby incorporated herein by reference in its entirety, is an industry overview containing hundreds of recipes for polymer-dispersed liquid crystals. In each case, these formulas are described as being intended for electrically operated devices (e.g., video displays). In most cases, laminated transparent electrodes are specifically identified. Further, the clearing points of the liquid crystals are not generally mentioned or commented on because it is generally assumed that the clearing points of electro-optical liquid crystal devices are well above the devices' intended operating temperatures. Thermotropic liquid crystals and low-clearing-point liquid crystals are not mentioned or implied, and where the liquid crystal mixtures are called out by name, they are commercial preparations such as E7 that have clearly defined (though unstated in the book) clearing points that are well above the useful switching range of a thermochromic or thermotropic building material. For example, Merck's E7 mixture has a clearing point of approximately 60° C. (140° F.), whereas the range of clearing points for a thermotropic building material (e.g., a thermally-switched, "smart" window film) may more typically be between 10° C. and 40° C. (although temperatures from a wider range of 0° C. to 60° C. may also be employed).

Therefore, it should be understood that the formulations described and summarized by Drzaic do not include thermally switched (as opposed to electrically switched) polymer-dispersed LC optical devices. However, thermotropic equivalents of the embodiments described by Drzaic may be constructed by removing electrical apparatus, such as transparent conductive layers, and substituting a chemically similar low-clearing-point liquid crystal for the high-clearing-point liquid crystals identified (e.g., a mixture of 3CB, 5CB and 7CB substituted for E7). Such preparations are distinctly different in their operation and application than the embodiments described and referenced by Drzaic and otherwise in the prior art and are explicitly not described or considered therein. Therefore, embodiments of the presently disclosed technology may further be in the form of thermotropic equivalents of the embodiments described by Drzaic.

The stabilizing polymer may be mixed to a concentration between 0.01% and 99.9% by weight or volume within the liquid crystal (depending upon the desired device and funtionality), or spatially within some portion of the liquid crystal, and may consist of a curable, thermoplastic, thermoset, or cross-linkable polymer material. Examples of such materials include, but are not limited to, the following: Sartomer SR295, SR339, CD2098, CN120, CN135, or CN153; bisphenol-A epoxy diacrylate; Norland 65, 68, 78, and 81 optical adhesives; any of the Devcon PB family of adhesives; and Loctite 3942. The stabilizing polymer may also consist of, or include, molecules functionalized at either end (e.g., diacrylates such as Sartomer CD9038) and functionalized liquid crystal molecules (e.g., functionalized 6CB, sold by Sigma Aldritch under catalog number 588474, also known as $C_{23}H_{25}NO_3$, CAS Number 117318-91-9). In addition, materials that make good surface treatments, as defined above, for this application are also capable of serving as stabilizing polymers so that, in principle, any of the materials listed above as surface treatments may also be used in this capacity. For example, when Sartomer PRO12228 is used as both a surface treatment and a stabilizing polymer, the peel strength of the resulting structure is relatively high, as the PRO12228 polymer adheres to itself better than it adheres to most other polymers. The stabilizing polymer may also include one or more photoinitiators (e.g., Irgacure 1173) so that it polymerizes in response to particular wavelengths of light, or thermal initiators (e.g., AIBN) so that it polymerizes in response to heat.

The curing stimulus may be applied uniformly or semi-uniformly across the device, as with a UV curing lamp, or may be applied in a pattern (e.g., via a photomask, diffraction grating, interference pattern, programmed exposure path, etc.). Additionally, the stimulus may vary with time (e.g., via a strobe light or pulse-width modulation controller) in order to adjust the phase separation and/or curing rate of the stabilizing polymer. It should be understood that layered structures (including distributed Bragg reflectors and other interference type filters) and three dimensional structures (including photonic crystals, holographic gratings, images, and patterns designed to harness dispersion effects) can be formed in this manner and may be part of the structure. In addition, the stabilizing polymer or polymers may serve as anchoring points for the LC molecules, or for other components or objects such as dye molecules.

The formation of a polymer network within a liquid crystal may result in a plurality of refraction mismatch interfaces that contribute to haze. Therefore, it may be desirable to select the polymer(s) and/or liquid crystal(s) to match the index of refraction of the polymer with that of the liquid crystal along one or more optical indices or axes, and/or the index of refraction of the substrate(s), or surface treatment(s), or other components. It may be desirable to select the properties of the various elements (e.g. the alignment layer, or the polymer-induced alignment of the liquid crystal(s)), to orient the liquid crystal(s) (and thus also components such as guest materials) such that for polarized light (as is, e.g., transmitted through a polarizing substrate), the indices of refraction of the liquid crystal(s) that interact with this polarization are better matched with those of the polymer stabilization, substrate(s), surface treatment(s), etc. It may also be desirable to select the LC and polymer such that they are mutually soluble, or alternatively, so that they are immiscible. It may also be possible to reduce haze by limiting the thickness of polymer strands (such that they are closer to the order of one wavelength of light) and/or by orienting the direction of such strands locally along or across the director of the liquid crystal(s), or by choosing the polymer stabilization to be more absorptive.

The spacer beads may be mixed to a concentration between 0.01% and 5.0% by weight or volume within the liquid crystal, and may consist of glass, silica, functionalized (e.g., methacrylated) glass, or polymer micro-scale spheres (e.g., of 3.5-micron diameter or greater). Sekisui Micropearl spacers and Merck Licristar spacers are known to work well for this application. However, the high cost of these spacer beads is primarily due to their precisely spherical shapes and narrow size tolerance. Spacer bead formulations with larger distributions of size and/or shape may also be used, and may cost significantly less. Mixtures of random and precision spacer beads (e.g., 50% random and 50% Licristar) may also be used. However, greater size distribution may also generally imply a larger cell gap so, in some cases, the savings on spacer bead cost may be offset by increased liquid crystal usage.

Spacers need not be spherical and, in many cases, need not be transparent and may in fact be part of the substrate material or the surface treatment, either because microspheres or other objects are intermixed with those materials, or because those materials have been etched, embossed, wrinkled, or chemically self-assembled, etc. in such a way that "bumps" form on their surfaces that are capable of acting as spacers. For example, a grid pattern of lines or dots built up or embossed into the surface of a material could serve the same function as a plurality of spacer beads. In another exemplary embodiment, spacer beads are mixed with a polymer (e.g., Sartomer PRO12228) and coated onto the surface of the substrate as a surface treatment.

For the reasons described above, it may be desirable to match the index of refraction of the spacer beads to that of the liquid crystal, stabilizing polymer, or other components or layers in order to reduce their haze contribution.

Figure 1:
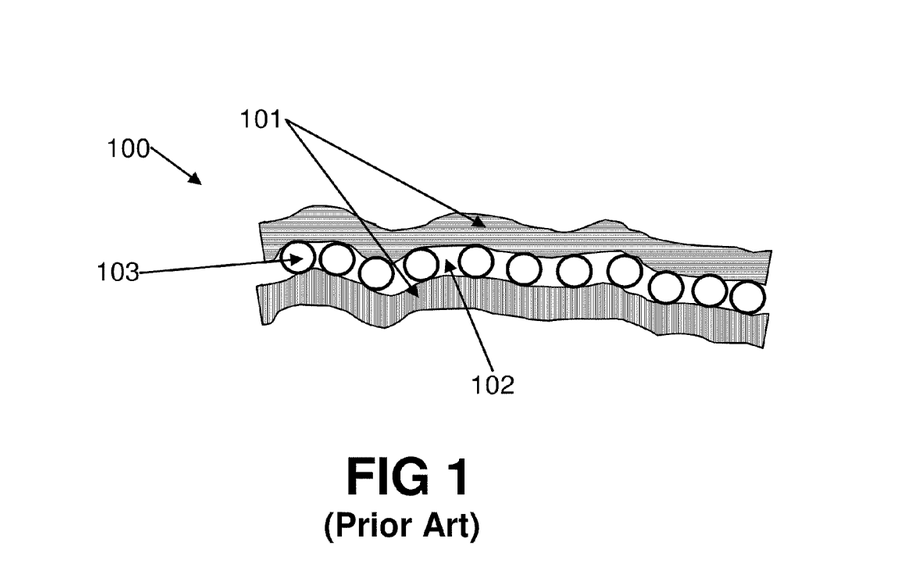
FIG. 1 is a schematic representation of a non-polymer-stabilized, thermotropic, liquid crystal-based optical filter.

FIG. 1 is from U.S. patent application no. 2010/0045924 by Powers et al. and is a schematic representation of a non-polymer-stabilized, thermotropic, liquid crystal-based optical filter 100. The space between the substrate materials 101 (e.g., polarizing films) is filled with a mixture of liquid crystal 102 and spacers 103. The spacers 103 in this design are microscopic, spherical, and have a small variance in size, providing a uniform cell gap between the substrate materials 101, such that the optical properties of the liquid crystal 102 do not vary in undesirable ways with location.

Figure 2:
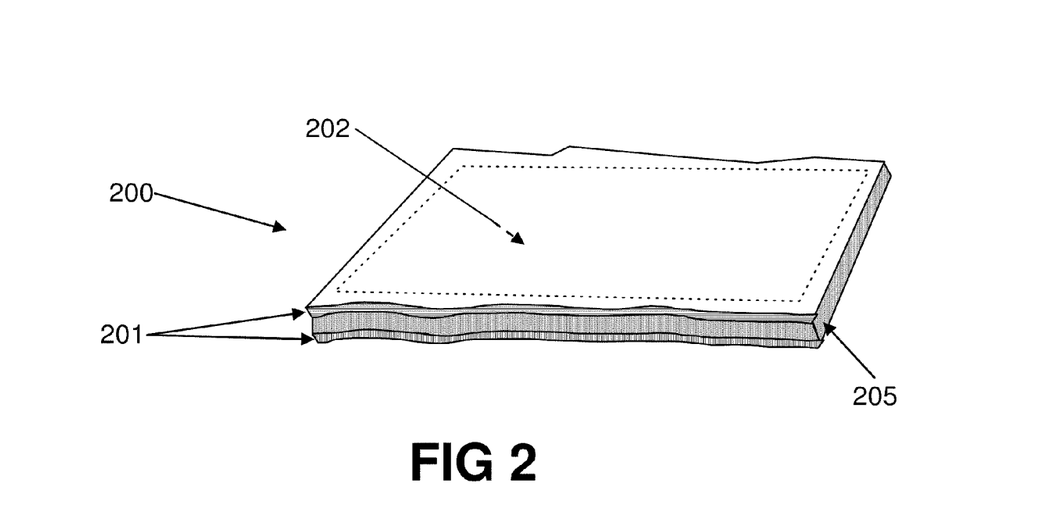
FIG. 2 is a schematic representation of a polymer-stabilized, thermotropic, liquid crystal-based optical filter wherein the stabilizing polymer is concentrated into one or more cell walls or edge gaskets to retain the liquid crystal.

FIG. 2 is a schematic representation of a thermochromic optical filter device 200 employing a polymer-stabilized, thermotropic liquid crystal mixture according to the implementations described above. In this embodiment, as with FIG. 1, the liquid crystal mixture 202 fills the space between the substrate materials 201 (e.g., polarizing films). In contrast to the prior art, however, the device 200 may be formed with one or more cell walls or edge gaskets made from a stabilizing polymer or polymer mixture 205 that form one or more liquid crystal cells. This may be accomplished, for example, by injecting the stabilizing polymer 205 around the perimeter of the device 200, between the substrate materials 201, and curing it with heat, UV radiation, or any other appropriate curing method. Alternatively, the stabilizing polymer may be combined with the surface treatment as a single layer, and selected such that the material is heat sealable, and a gasket can be formed at the perimeter of the filter, or at any other location within or across the filter, by means of a heat sealer. In either case, the stabilizing polymer 205 forms a retention barrier that prevents the liquid crystal mixture 202 from escaping the device 200. Alternatively, the same or an equivalent pattern may be cured embossed, or otherwise formed into the substrate or surface treatment, producing walls that yield the same effect. In this case, the substrate or surface treatment material and the stabilizing polymer may in fact be the same material.

In one exemplary implementation, the stabilizing polymer 205 may be distributed as a pre-polymer throughout the liquid crystal mixture 202 at the time of assembly of the filter device 200. The filter device 200 may be subsequently irradiated with UV or similar radiation through a photomask or other periodic, light-attenuating structure, such that phase separation and curing of the pre-polymer forms a plurality of cell walls or edge gaskets that subdivide the filter device 200 into a plurality of liquid crystal cells. This arrangement has the advantage that the device can be cut into smaller pieces (e.g., with scissors or other cutting blade) and the liquid crystal mixture 202 will be retained in each of the cells that are not individually cut. Thus, the filter can be resized, for example, at the point of use. Furthermore, if the liquid crystal mixture 202 is selected appropriately, the viscosity and surface tension, combined with the surface energy or wettability of the substrate, may be such that the liquid crystal mixture 202 is retained even within the cut cells. In other words, it may be energetically favorable for the liquid crystal mixture 202 to remain within the cut cell rather than leaking out, although mechanical forces such as applied pressure or twisting may be sufficient to expel it, or to admit air that may displace it. In this case, it may be desirable to apply additional stabilizing polymer 205 along the cut edge and cure it by any of the methods indicated above in order to reseal the cut edge and thus maximize the thermotropic or thermochromic area of the cut or resized device or devices.

In an exemplary form of this edge-stabilized device, the top and bottom substrates are cut to the same dimensions. An acrylic surface treatment, for example, Sartomer PRO12228 solvated in isopropanol, is applied to both films with a Mayer rod, allowed to dry to a thickness of approximately 1.4 microns, and cured under a mercury UV lamp to a total UV-A dose of 26 J/cm$^2$. An alignment layer is applied to each surface by rubbing it with a cloth-covered rub bar, rotary buffing cylinder, or equivalent apparatus. A mixture of LC and spacer beads is introduced between the two films and spread with a roller, squeegee, felt-wrapped putty knife, or the equivalent, and any excess LC is wiped away from the edges with a paper towel or cleanroom wipe. All four edges of the filter are then sealed using ¼' wide gasket made of Devcon 18305 photopolymer, injected around the perimeter of the device using a needle-tipped pneumatic syringe and then cured with a UV-V dose of 10-15 J/cm$^2$. The filter is now ready for resizing.

One edge of the filter may be cut with a paper cutter, rotary cutter, laser cutter, die cutter, water jet, pair of scissors, or any equivalent process or device. The viscosity and surface tension of the liquid crystal mixture provide retention within the cut edge so long as the filter is not subjected to excessive flexure. The filter is then secured to a surface (e.g., a tacky silicone mat), and the cut edge is resealed and re-cured using Devcon 18305 by the same method described above. A small "port" may be left open at one corner to allow for pressure release and to prevent a "ketchup packet effect" of material squirting out when pressure is applied to the filter. Excess LC is forced out of the "port" using tools mentioned above, sometimes with the aid of gravity, and then the port is "plugged" with 18305 photopolymer and cured as described above. The filter is then laminated to glass using a UV-blocking pressure-sensitive adhesive such as Cytec GMS-AX4000, with a maximum nip roller pressure of 70 psi to prevent vacuum bubbles or pressure bruises (regions from which the spacer beads have been excluded) from forming in the liquid crystal. Typical conditions for this lamination process include a roller temperature of 100° F. and speed of 2 ft/min, although other conditions are known to work as well.

In another exemplary embodiment, the substrates are LG Chem adhesive-backed polarizers, and the surface treatments are 25-micron-thick clear APET films that have been laminated to the adhesive layer and rubbed with a buffing cylinder to produce an alignment layer. In this embodiment, the surface treatment also serves as the stabilizing polymer. The space between the two surface-treated substrates is filled with a mixture of liquid crystal and spacer beads, and the edges of the filter are heat sealed with a constant-temperature sealer at 212° C. for 12 seconds. The filter may then be conveniently resized at any time by heat sealing a new seam across it, and then cutting along the seam.

By cutting and resealing one or two edges, it is possible to form a resized filter of any rectangular dimensions smaller than the original filter and, by cutting multiple edges in this way, or by cutting at angles or in lines that are not straight, it is possible to create a filter of any shape. Some liquid crystal mixtures may have sufficient viscosity and surface tension to accomplish this process without the need for a stabilizing polymer dispersed throughout it. However, in the more general case, a stabilizing polymer may be used to enhance the viscosity and surface tension of the liquid crystal mixture.

The liquid crystal mixture 202 may additionally contain spacer beads (not shown) and may also contain one or more additional stabilizing polymers 205. In addition, the substrate materials 201 may have one or more transparent or translucent surface treatments (not shown) applied to them to promote adhesion and/or wettability, to provide a liquid crystal alignment layer, and/or to prevent unwanted physical or chemical reactions between the liquid crystal mixture 202, the stabilizing polymer 205, and the substrate materials 201. Sartomer PRO12228 works well in this application, although a large plurality of other materials may be used instead or in addition.

Figure 3:
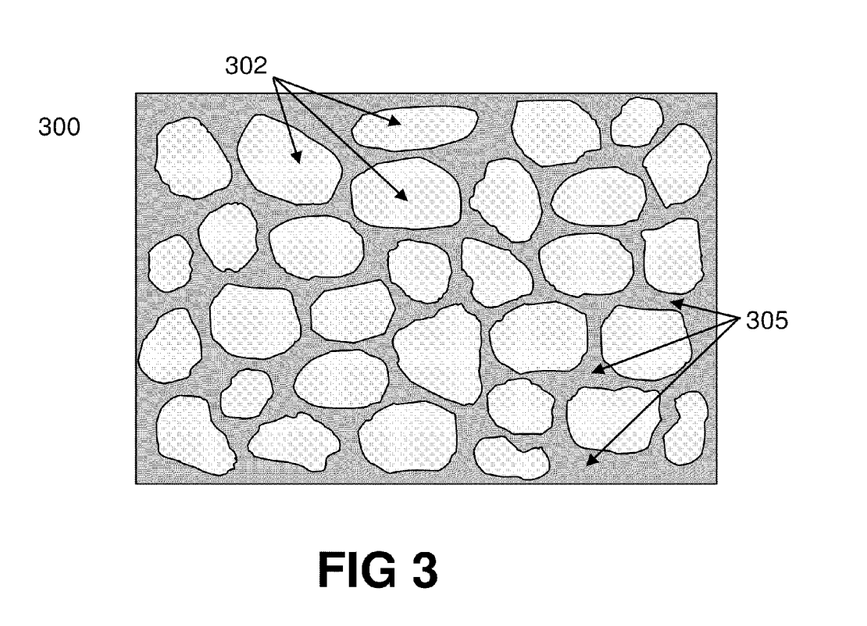
FIG. 3 is a schematic top plan view of a phase-separated LC-polymer structure.

FIG. 3 is a schematic top plan view of a phase-separated LC-polymer structure 300, in which the liquid crystal mixture 302 has formed droplets or voids within a polymer matrix 305 or, alternatively, in which the stabilizing polymer 305 has formed wall or gasket structures that interpenetrate the liquid crystal 302 and attach or adhere to the substrate(s) or surface treatment(s) (not pictured). The phase separation of the liquid crystal mixture 302 and the stabilizing polymer 305 may be most easily accomplished if the molecules of the liquid crystal mixture 302 are polar and the molecules of the stabilizing polymer 305 are non-polar or, conversely, if the molecules of the liquid crystal mixture 302ares non-polar and the molecules of the stabilizing polymer 205 are polar. However, this is not strictly necessary, and many examples of the present embodiment may employ polar-polar and nonpolar-nonpolar combinations to good effect.

For example, in one exemplary embodiment, the liquid crystal mixture 302 may be a blend of odd-numbered cyanobiphenyls (e.g., 3CB, 5CB, and 7CB) and the stabilizing polymer 305 may be a mixture of 92.2% Sartomer CD9038 cross-linker, 4.9% Sartomer SR339 plasiticizing monomer, 2.4% H-Nu 470X visible light photoinitiator, and 0.5% Sartomer CN153 epoxide, dissolved into the liquid crystal mixture 302 at a weight percentage of 15%. Licristar spacer beads of 10 μm are added at 0.35% of the total mixture weight. The polarizer substrate (TAC) is overcoated with 25% by weight Sartomer PRO12228 solvated in IPA and then cured for 8 minutes under a mercury lamp centered at the 420 nm wavelength. The substrate is then pre-treated with IPA and then an alignment layer is created using a cylindrical cotton buffer in the roll direction of the substrate. A corona treatment step may also be added after alignment to promote adhesion of the polymer mix with the overcoat material. The polymer mixture is then loaded between two aligned substrates that have been heated to 40° C. Pressure is applied to remove excess polymer mix and a cell gap is maintained and defined by the spacer bead size. This polymer mixture 305 is then phase separated from the liquid crystal mixture 302 by "flash cooling" from 40° C. to −15° C. over a period of 60 seconds, and then cured for 30 minutes under a mercury lamp with a center wavelength of 420 nm.

The structure shown in FIG. 3 is a plurality of liquid crystal bubbles encapsulated by a plurality of closed polymer cells. However, before curing, this structure may evolve over time such that the bubbles of liquid crystal merge and grow, and the polymer walls merge and shrink, until the structure becomes an open-celled network interpenetrated by (non-encapsulated) liquid crystal. Further in time, the polymer walls may form isolated "paisley" structures, and eventually isolated circular posts that link the upper and lower substrates but do not connect to one another. Additional time may finally cause these pillars to "slump" and form a layer or coating on the lower substrate or surface treatment. However, the curing stimulus may be applied at any point along this evolution, halting the process and rendering the polymer-LC structures durable. All of the structures described above may be formed by the process described above.

In another exemplary embodiment, the phase separation is accomplished by curing energy gradients. The same mixtures and curing procedure is used as in the above example, except that a photomask (e.g., a microscopic grid pattern printed onto glass or a polymer film) is temporarily laminated to the top surface of the sample, and the flash cooling step is deleted. Curing takes place in the isotropic state of the LC at a temperature of 50° C. In this case, the cell walls formed by the polymer mixture 305 are not randomly self-assembled, but form according to the pattern in the photomask (e.g., a grid of well-formed lines).

In still another exemplary embodiment, the stabilizing polymer is printed onto a rubbed, PRO12228-coated polarizing film via ink jet, anilox, silk screen, or other standard printing process, such that a pattern of walls, paisleys, posts, etc. is formed. The polymer may or may not be partially cured in order to promote adhesion and/or keep the pattern from running or slumping. The liquid crystal mixture is then coated over the top of this polymer structure, and a second polarizer is laminated to the top. The entire structure is then cured in the same manner described above.

In still another exemplary embodiment, the stabilizing polymer is coated onto the lower substrate in a uniform layer, and the layer is then exposed to a partial curing dose of radiation through a photomask, and the uncured polymer is stripped away with a solvent in a manner comparable to the process used in semiconductor photolithography. The LC is then added and the whole structure cured as described above. Alternatively, the stabilizing polymer may be a pressure-sensitive adhesive (PSA) that does not require any curing. In this case, the polymer is patterned on the substrate as described above, but with no partial cure or pre-cure, then the printed PSA pattern is coated with LC, and the upper substrate is laminated over the top with no final cure.

However, these are merely exemplary recipes and a large plurality of other components and procedures may be used instead or in addition to achieve the same or similar effects, i.e., the forming of polymer walls to contain the liquid crystal and adhere to the substrate(s) and/or surface treatment(s).

The phase separation of the polymer or pre-polymer components from the LC can create cells or gaskets around the liquid crystal. The thickness of the "walls" or gaskets and mean distance between them can be controlled through appropriate choices of LC components (including properties such as viscosity, solubility in the polymer mixture, molecular weight, polarity, etc.), polymer or pre-polymer components (including properties such as viscosity, solubility in the LC mixture, molecular weight, polarity, etc.) time and temperature profiles, concentrations of spacers, LC cell gap, curing profile (e.g., UV dosage profile in UV-curable systems), etc. By analogy, one version of cells or gaskets might be viewed as "degenerate" PDLC-like structures, where the "soap bubbles" of polymer have popped until there is only one layer of "bubbles" with no tops or bottoms, only sides which form the cell walls or gaskets. This possibility is stated for exemplary purposes only and should not be construed as limiting. Before curing, the clearing point of the liquid crystal may be affected by pre-polymers dissolved in it, which may affect the processes required to realize the desired phase separation and polymer structures.

The phase-separated structure shown in FIG. 3 is included herein for exemplary purposes only. Phase separation is not necessary in order for the stabilizing polymer to perform its function.

Figure 4:
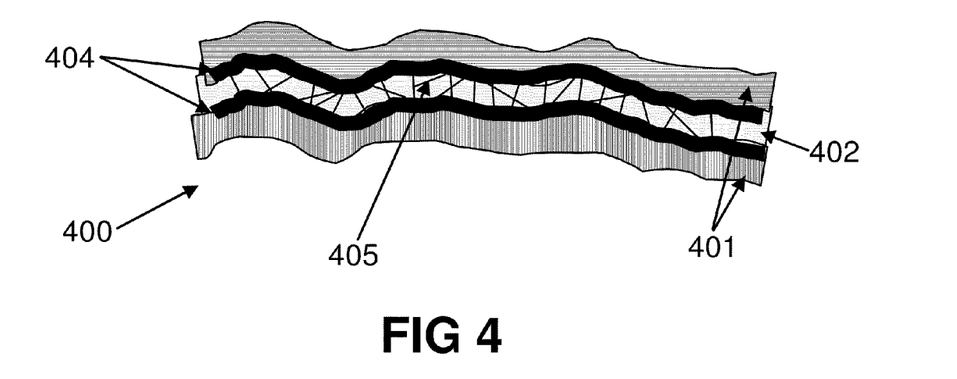
FIG. 4 is a schematic representation of a polymer-stabilized, thermotropic, liquid crystal-based optical filter wherein the stabilizing polymer is distributed throughout the liquid crystal mixture.

FIG. 4 is a schematic representation of a thermochromic optical filter 400 incorporating polymer-stabilized, thermotropic liquid crystal mixture. As before, the liquid crystal mixture 402 lies between the two substrate materials 401 (e.g., polarizing films), and the stabilizing polymer 405 may be cured within it, but is not necessarily phase separated. Rather, it may be interspersed with the liquid crystal mixture 402 at a much smaller scale (e.g., the molecular level), such that if forms a thready or spongy network having features that may be too small to resolve with an ordinary optical microscope. The liquid crystal mixture 402 may be a combination of liquid crystal components selected such that they have the desired values of clearing point, freezing point, UV stability, and miscibility, along with chemical/mechanical properties that cause the molecules to align and change phase in the desired manner. The spacer beads are not shown in the image for clarity, but may be present in the mixture as per FIG. 1.

In the implementation shown in FIG. 4, a transparent surface treatment 404 has been applied to both substrate films 401 of the polymer-stabilized, thermochromic LC device 400 using standard coating methods and a polymer network 405 is formed within the liquid crystal 402. Such methods generally involve mixing a pre-polymer with the liquid crystal 402 to a certain percentage (e.g., 5% by weight), and then applying a stimulus that both induces (some) phase separation of the pre-polymer and liquid crystal 402, and also cures the pre-polymer into a polymer. The exact stimulus required depends on the pre-polymer being employed, as well as any dopants, catalysts, or initiators that may be present, and any inhibitory properties that may be present in the substrate or LC materials. For example, many polarizing films are highly attenuating to UV light (e.g., greater than 99% attenuation), so that UV curing of the polymer is impractical. However, the addition of a visible-light photoinitiator may make it possible to cure a nominally-UV-curing material with visible light (e.g., violet light at 420 nm wavelength), which may lose only about 60% of its intensity when passing through an exemplary polarizer. Laser and LED sources may produce polarized light, of which a significantly higher percentage may pass through the polarizer if the optical axes of the light source and the polarizer are properly aligned. In addition, laser and LED sources may produce light in a narrow range of wavelengths that may be matched to one or more photoinitiators (or vice-versa) such that a high percentage of the incoming light energy may be transmitted to effect polymerization of the polymer mixture. This may serve to minimize unwanted heating of the sample during the curing step.

The surface treatment provides adhesion between the substrates 401 and the stabilizing polymer network 405 in the presence of the liquid crystal 402. The stabilizing polymer network 405 provides adhesion across the liquid crystal cell gap and allows the device 400 to behave as a single object, rather than as two substrates with a liquid in between them. In some cases the stabilizing polymer network 405 may also provide retention for the liquid crystal mixture 402.

In one exemplary embodiment, the liquid crystal mixture 402 consists of 51% 5CB, 45% 7CB, and 4% B2 and has a clearing point of approximately 46° C. The substrates are LG Chem polarizing films, and the surface treatments are 1.4-micron coatings of Sartomer PRO12228 prepared as described above and rubbed with a felt-covered rub bar to produce the alignment layers. The polymer mixture 405 consists of 98% bisphenol-A epoxy diacrylate and 2% H-Nu 470X visible light photoinitiator. The polymer mixture 405 is dissolved into the LC mixture 402 at a weight percentage of 5% and the whole mixture is cured through under a mercury lamp with a peak wavelength of 420 nm for 30 minutes.

It should be understood that the liquid crystal 402 may interact with a wide variety of polymers and adhesives, either by solvating or chemically attacking them, or by interfering with the mechanisms of polymerization or adhesion, either at room temperature or under the extremes of heat, cold, and UV that may be present in, for example, a building material application such as a window film. Thus, the transparent surface treatment 404 and the stabilizing polymer network 405 may be selected from materials that are known to be resistant to these conditions. Such materials include, but are not limited to, the broad family of acrylates, including ethyl cyanoacrylates, methyl cyanoacrylates, thiol-ene adhesives, diacrylates, triacrylates, methacrylates, urethane acrylates, and acrylated epoxies. Specific commercial preparations that are known to work in this context (with some cyanobiphenyl LC chemistries, and other liquid crystals) include Sartomer SR295, CN135, CN153, SR339, SR340, SR368, CD9038, CN9008, CN991, CN999, and CN120; bisphenol-A epoxy diacrylate; Norland 65, 68, and 81 optical adhesive; Devcon PB3500; Loctite 3942; and Bekaert Specialty Films Hardcoat-RB. The stabilizing polymer may additionally be composed of monomers, oligomers, cross-linkers, dual-ended functional molecules (e.g., diacrylates), multi-ended functional molecules (e.g., triacrylates), or side-chain-functionalized liquid crystal molecules (e.g., Sigma Aldrich 588474, also known as $C_{23}H_{25}NO_3$, CAS Number 117318-91-9). However, it should be understood that a variety of other materials may be used that serve the same function of phase separation, curing, adhesion, retention, etc. within the LC mixture.

It may also be beneficial to select the surface treatment for wettability, i.e., so that its surface energy exceeds the surface tension of the liquid crystal and thus permits wetting of the surface by the liquid crystal, and ready alignment of the liquid crystal molecules in a configuration parallel to the surface (i.e., low pretilt angle), which is useful for nematic and twisted nematic devices. Alternatively, a low surface-energy, non-wettable surface will tend to align the liquid crystal molecules in a vertical (perpendicular to the surface, high pretilt angle) orientation, which is useful for other types of liquid crystal devices including, but not limited to, guest-host devices.

Numerous variations on the disclosed embodiments are also possible, by means of deleting or combining certain components. For example, the liquid crystal can be coated and cured to a particular desired thickness without the need for spacer beads. Spacer-free formulations are therefore alternate implementations of this technology. Alternatively or in addition, if the proper substrate is selected, it is possible to formulate an embodiment of a polymer-stabilized, thermochromic LC device without a transparent or translucent surface treatment (or where the surface treatment and substrate have, in effect, been combined as a single object). It is also possible to coat the polymer-stabilized liquid crystal onto a surface, cure it, and then "peel it up" so that the polymer-stabilized liquid crystal structure exists independent of any substrate. Thus, an exemplary formulation may consist only of liquid crystal and a stabilizing polymer, and nothing else.

In addition, the components of the polymer-stabilized, thermochromic LC device may be formulated from different materials or in different forms than those disclosed herein, so long as they perform an equivalent physical or chemical function. For example, the spacer beads could be replaced with rods, wires, fibers, or other objects of suitable dimension. Alternatively, the polymers and adhesives cited as stabilizing polymers and/or surface treatments could be replaced with other materials, including inorganic oxides and nitrides, so long as they serve an equivalent chemical or physical function. The stabilizing matrix may be fashioned out of silicones rather than organic (carbon-based) polymers, or may even be fashioned from non-polymer materials including, but not limited to, inorganic aerogels such as silica aerogel, either by forming said materials in the presence of the liquid crystal or by absorbing the liquid crystal into such a matrix. It is also possible to form the stabilizing network or matrix with one LC or other liquid, which is then removed and replaced with a second LC. In some cases, it may also be both feasible and desirable to have the weight or volume percentage of stabilizing polymer within the LC be higher than 50%.

Thus, it should be apparent that a polymer-stabilized, thermotropic, low clearing point liquid crystal device suitable for use as a temperature-responsive optical filter may encompass a variety of dissimilar but functionally equivalent chemistries.

Furthermore, while the term "liquid crystal" is employed throughout this document, it should be understood that many of the same optical principles may be applied to materials that have clearly defined solid and liquid properties but do not necessarily have an intermediate "liquid crystal" state between the isotropic and solid (e.g., crystalline or amorphous) state. Thus, a low-melting-point polymer or similar material may in some cases be substituted for the liquid crystal. Similarly, though the term "polymer" is employed throughout this document, it should be understood that many of the same stabilizing properties may be found in other materials, which can be similarly substituted.

Finally, a number of optional components may be added to enhance the durability or usefulness of the filter device. For example, optical components such as partially mirrored coatings, antireflection coatings, Bragg reflectors, retarders, bandpass and bandblock filters, highpass and lowpass filters, UV blockers, and low-emissivity coatings may be employed either in the filter device itself or as part of a window structure or other optical stack that incorporates it.

The above specification, examples and data provide a description of the structure and use of some exemplary embodiments of the technology. Although various embodiments have been described above with a certain degree of particularity, or with reference to one or more individual embodiments, those skilled in the art could make numerous alterations to the disclosed embodiments without departing from the spirit or scope of the invention as provided in the claims below. Other embodiments are therefore contemplated.

All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting. Changes in detail or structure may be made without departing from the basic elements of the invention as defined in the following claims.

What is claimed is:

1. A method for manufacturing a resizable polymer-stabilized, thermotropic liquid crystal device comprising
providing a transparent substrate;
coating the substrate with a mixture of liquid crystal components;
defining and maintaining a thickness of the mixture of liquid crystal components;
applying a stabilizing polymer to the substrate in conjunction with the mixture of liquid crystal components;
distributing the stabilizing polymer throughout the mixture of liquid crystal components to form a plurality of walls that define a plurality cells, each wall enclosing a portion of the mixture of liquid crystal components within the cell that is defined by the wall; and
curing the stabilizing polymer with an external stimulus to adhere the stabilizing polymer.

2. The method of claim 1 further comprising
treating a surface of the substrate with a material that is wholly or partially transparent or translucent to one or more wavelength bands and that promotes polymer adhesion with the substrate.

3. The method of claim 1, wherein the defining and maintaining operations further comprise distributing a plurality of micro-scale spacers within the mixture of liquid crystal components.

4. The method of claim 1 further comprising
providing a transparent opposing substrate;
treating a surface of the substrate and the opposing substrate with a wholly or partially transparent or translucent material that promotes polymer adhesion with the opposing substrate;
distributing a plurality of micro-scale spacers within the mixture of liquid crystal components as part of the defining and maintaining operations;
placing the opposing substrate over the mixture of liquid crystal components, the micro-scale spacers, and the stabilizing polymer on the substrate; and
adhering the opposing substrate with the surface treatment material to the stabilizing polymer.

5. The method of claim 4 further comprising cutting the resizable polymer-stabilized, thermotropic liquid crystal device forming a cut edge with negligible or no leakage of the mixture of liquid crystal components from between the substrate and the opposing substrate along the cut edge as any leakage of the mixture of liquid crystal components from between the substrates is limited to the mixture of liquid crystal components in only a portion of the cells that fall on the cut edge.

6. The method of claim 1 further comprising removing the transparent substrate from the mixture of liquid crystal components and the stabilizing polymer after curing the stabilizing polymer.

7. The method of claim 1 further comprising applying the external stimulus uniformly across the device.

8. The method of claim 1 further comprising applying the external stimulus non-uniformly to produce a deliberate pattern of the stabilizing polymer across the device.

9. The method of claim 1, wherein the applying operation further comprises applying the stabilizing polymer in a pattern across the substrate.

10. The method of claim 1, wherein the mixture of liquid crystal components is miscible with the stabilizing polymer and the curing operation creates a matrix of the stabilizing polymer within which the mixture of liquid crystal components is retained.

11. The method of claim 4, wherein the applying operation further comprises applying the stabilizing polymer about an outer perimeter of the mixture of liquid crystal components and sealing an outer edge between the substrate and the opposing substrate.

12. The method of claim 1, wherein the curing operation comprises one of the following: solidifying the stabilizing polymer, melting and re-solidifying the stabilizing polymer, or cross-linking the stabilizing polymer.

13. The method of claim 1, wherein the curing operation comprises one of the following actions with respect to the stabilizing polymer: heating, photo-initiation, visible light exposure, ultraviolet exposure, electron beam, epoxy curing, application of water, changing solvent concentration, or providing a chemical accelerant.

14. The method of claim 2 further comprising including a photoinitiator or a thermal initiator in the transparent or translucent surface treatment material.

15. The method of claim 1 further comprising selecting a formulation for the mixture of liquid crystal components with an index of refraction that is substantially the same as an index of refraction of the stabilizing polymer or vice versa.

16. The method of claim 1 further comprising modifying the clearing point to be higher than 40° C. or lower than 10 C., such that thermotropic properties of the mixture of liquid crystal components are effected at operating temperatures of non-atmospheric temperature environments.

17. The method of claim 5 further comprising
applying additional stabilizing polymer along the cut edge; and
curing the additional stabilizing polymer, thereby resealing the cut edge.

18. The method of claim 1 further comprising
modifying the clearing point to be between 10° to 40° C. such that thermotropic properties of the mixture of liquid crystal components are effected at operating temperatures of atmospheric temperature environments.

* * * * *